US011728984B2

United States Patent
Wade et al.

(10) Patent No.: US 11,728,984 B2
(45) Date of Patent: Aug. 15, 2023

(54) HYBRID PUBLIC-KEY AND PRIVATE-KEY ENCRYPTION SYSTEM

(71) Applicant: Howard University, Washington, DC (US)

(72) Inventors: Mamadou Ibra Wade, Washington, DC (US); Tepper Gill, Washington, DC (US)

(73) Assignee: HOWARD UNIVERSITY, Washington, DC (US)

( * ) Notice: Subject to any disclaimer, the term of this patent is extended or adjusted under 35 U.S.C. 154(b) by 152 days.

(21) Appl. No.: 17/125,300

(22) Filed: Dec. 17, 2020

(65) Prior Publication Data

US 2022/0200799 A1 Jun. 23, 2022

(51) Int. Cl.
*H04L 9/08* (2006.01)
*H04L 9/14* (2006.01)
*H04L 9/30* (2006.01)
*G06F 21/60* (2013.01)

(52) U.S. Cl.
CPC .......... *H04L 9/0869* (2013.01); *G06F 21/602* (2013.01); *H04L 9/14* (2013.01); *H04L 9/30* (2013.01)

(58) Field of Classification Search
CPC . H04L 9/0869; H04L 9/14; H04L 9/30; G06F 21/602
See application file for complete search history.

(56) References Cited

U.S. PATENT DOCUMENTS

| 2004/0044894 A1 | 3/2004 | Lofgren et al. |
| 2011/0238985 A1 | 9/2011 | Sovio et al. |
| 2019/0028608 A1* | 1/2019 | Kang ................ H04N 1/4413 |

FOREIGN PATENT DOCUMENTS

WO 2019/227009 A1 11/2019

OTHER PUBLICATIONS

Mamadou I. Wade et al., "Red Green Blue Image Encryption Based on Paillier Cryptographic System", May 2018 (Year: 2018).*
Arun S. Muktibodh et al., "Santilli's Isomathematics; Some Recent Developments", Jun. 2016 (Year: 2016).*
Mamadou I. Wade et al., "Distributed Image Encryption Based on a Homomorphic Cryptographic Approach" Oct. 2019 (Year: 2019).*

(Continued)

*Primary Examiner* — Shanto Abedin
*Assistant Examiner* — Alan L Kong
(74) *Attorney, Agent, or Firm* — Sughrue Mion, PLLC (57) ABSTRACT

A method, computer program, and computer system is provided for encrypting data or information represented by bits, numbers, used to encode images, text, or audio. For the case of an RGB image encryption applications, the data may be separated into its constituent channels before encryption. In addition to the standard encryption keys, another encryption isokey is generated based on an isounit using an algebraic isofield having a multiplicative identity value different than the number one. On the sender side, each of the channels is encrypted using the standard keys and the generated isokey. On the receiver side, each encrypted channel is decrypted before combining them to obtain the recovered RGB image. In addition to images, the cryptographic algorithm can also be used the encrypt data related to text, audio, and other file types.

16 Claims, 7 Drawing Sheets

(56) References Cited

OTHER PUBLICATIONS

Chun-Xuan Jiang, "Foundations of Santilli's Isonumber Theory with Applications to New Cryptograms, Fermat's Theorem and Goldbach's Conjecture" Jan. 2002 (Year: 2002).*
Arun S. Muktibodh, "Studies on Santilli's Isonumber Theory", Mar. 2016 (Year: 2016).*
Ruggero Maria Santilli, "Hadronic Mathematics, Mechanics and Chemistry", Jan. 2008 (Year: 2008).*
International Search Report dated Mar. 2, 2022 in International Application No. PCT/US2021/063529.
Written Opinion of the International Searching Authority dated Mar. 2, 2022 in International Application No. PCT/US2021/063529.

* cited by examiner

HYBRID PUBLIC-KEY AND PRIVATE-KEY ENCRYPTION SYSTEM

BACKGROUND

This disclosure relates generally to field of computing, and more particularly to encryption.

In mathematics, an identity element is a type of element of a set with respect to a binary operation on that set, which leaves any element of the set unchanged when combined with it. For example, in the set of real numbers, the operation of adding zero to a number yields the same number. Thus, it may be said that zero is the additive identity. In the same way, the operation of multiplying a number by one yields the same number, and the multiplicative identity can be said to be one.

SUMMARY

Embodiments relate to a method, system, and computer readable medium for encrypting binary files. According to one aspect, a method for encrypting binary files is provided. The method may include separating a binary file into one or more channels. One or more encryption isokeys are generated based on an isounit corresponding to an algebraic field having a multiplicative identity value different than the number one. The one or more channels are encrypted using the generated encryption isokeys. An encrypted binary file is generated based on combining the one or more encrypted channels.

According to another aspect, a computer system for encrypting binary files is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include separating a binary file into one or more channels. One or more encryption isokeys are generated based on an isounit corresponding to an algebraic field having a multiplicative identity value different than the number one. The one or more channels are encrypted using the generated encryption isokeys. An encrypted binary file is generated based on combining the one or more encrypted channels.

According to yet another aspect, a computer readable medium for encrypting binary files is provided. The computer readable medium may include one or more computer-readable storage devices and program instructions stored on at least one of the one or more tangible storage devices, the program instructions executable by a processor. The program instructions are executable by a processor for performing a method that may accordingly include separating a binary file into one or more channels. One or more encryption isokeys are generated based on an isounit corresponding to an algebraic field having a multiplicative identity value different than the number one. The one or more channels are encrypted using the generated encryption isokeys. An encrypted binary file is generated based on combining the one or more encrypted channels.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of computing, and more particularly to encryption. The following described exemplary embodiments provide a system, method and computer program to, among other things, encrypt and decrypt images using public and private isokeys generated based on using a multiplicative identity other than one. Therefore, some embodiments have the capacity to improve the field of computing by allowing for an additional degree of freedom for the production of highly secured encrypted images, which may be able to withstand a wide variety of attacks.

As previously described, in mathematics, an identity element is a type of element of a set with respect to a binary operation on that set, which leaves any element of the set unchanged when combined with it. For example, in the set of real numbers, the operation of adding zero to a number yields the same number. Thus, it may be said that zero is the additive identity. In the same way, the operation of multiplying a number by one yields the same number, and the multiplicative identity can be said to be one. Many encryption systems operate in the set of real numbers. However, some systems do not yield adequate results or are computationally intensive. It may be advantageous, therefore, to use a multiplicative identity other than that of the set of real numbers to provide an additional degree of freedom in the encryption and decryption processes that may allow for improved results, such as decryption that may yield outputs that may be more similar to the original, unencrypted images.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program in which an RGB image may be separated into its constituent channel images. A public encryption key may be used to encrypt each channel's pixel intensity values. The encrypted channel images may be combined and compressed if necessary before transmission through a possibly unsecured communication channel. The transmitted image may subsequently be recovered by a decryption process used in conjunction with private decryption keys.

According to one or more embodiments, the multiplicative identity one may be replaced by a different multiplicative identity unit that may provide an additional degree of freedom for the encryption process. The new multiplicative identity unit may be used as a shared private encryption and decryption isokey. By utilizing the multiplicative identity as a private isokey, security may be improved through increasing the number of decryption keys required for an attacker to gain access to the transmitted images.

It may be appreciated that the real numbers may be an algebraic field, which may be represented by a five-tuple $(\mathbb{R}, +, 0, *, 1)$, where zero may be the additive identity and one may be the multiplicative identity. Because there may be an implicit sense of direction from left to right for $\mathbb{R}$, the field may be represented as a six-tuple $(\mathbb{R}, +, 0, *, 1, \rightarrow)$. Accordingly, the real number system may be considered to be not symmetric. Therefore, a complementary six-tuple $(\hat{\mathbb{R}}, +, 0, *, \hat{1}, \leftarrow)$ may be used to represent the real numbers, whereby the unit for addition may be unchanged, but the new unit for multiplication may be $\hat{1}=-1$. Thus, $\hat{a}*\hat{b}=(-a)(-1)(-b)=-ab=\widehat{ab}$. The field $(\hat{\mathbb{R}}, +, 0, *, \hat{1}, \leftarrow)$ may be considered as an isotopic representation of the real numbers where the new multiplicative identity unit is in the field (i.e., $(-1)=\hat{1} \in \mathbb{R}$).

However, it may be appreciated that the multiplicative identity unit $\hat{1}$ may not be in the field. For example, the field $F(a, +, *)$ may be given (e.g., Zp, with p prime), and the multiplicative identity unit $\hat{I}=\hat{T}^{-1} \notin F$ may be an invertible quantity. A new definition of multiplication may be defined on F using operator $*=\hat{T}=\hat{I}^{-1}$. This may allow a new field $\hat{F}(\hat{a}, +, *)$ to be defined with elements and rules given by: $\hat{a}=a\hat{I}$, $\hat{a}*\hat{b}=(a\hat{I})\hat{T}(b\hat{I})=ab\hat{I}=\widehat{ab}$; $\hat{a}+\hat{b}=(a\hat{I})+(b\hat{I})=(a+b)\hat{I}=\widehat{a+b}$.

Figure 1:
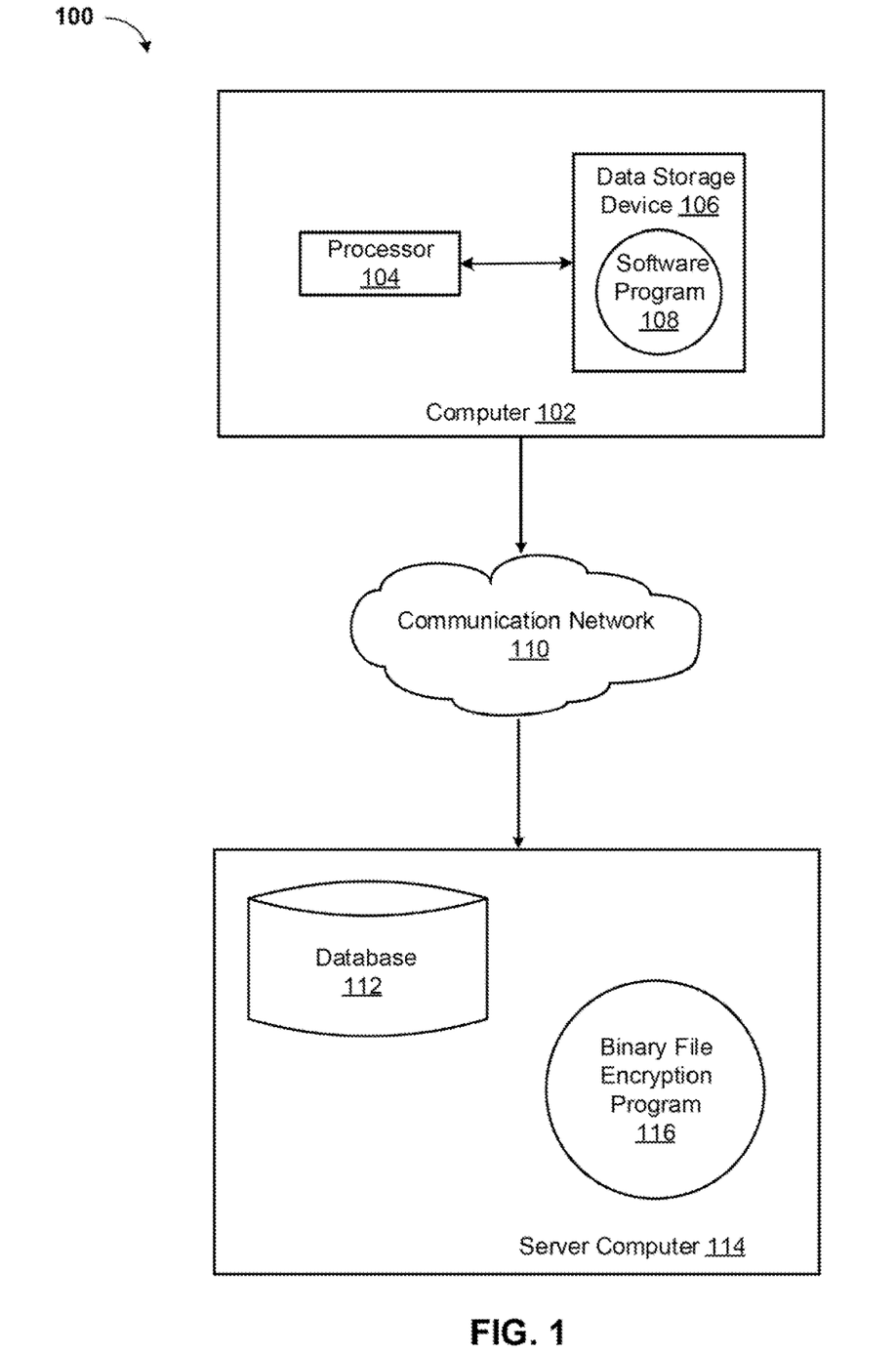
FIG. 1 illustrates a networked computer environment according to at least one embodiment.

Referring now to FIG. 1, a functional block diagram of a networked computer environment illustrating a binary file encryption system 100 (hereinafter "system") for encrypting binary files. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 5 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for encrypting binary files is enabled to run an Binary File Encryption Program 116 (hereinafter "program") that may interact with a database 112. The Binary File Encryption Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger binary file encryption program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
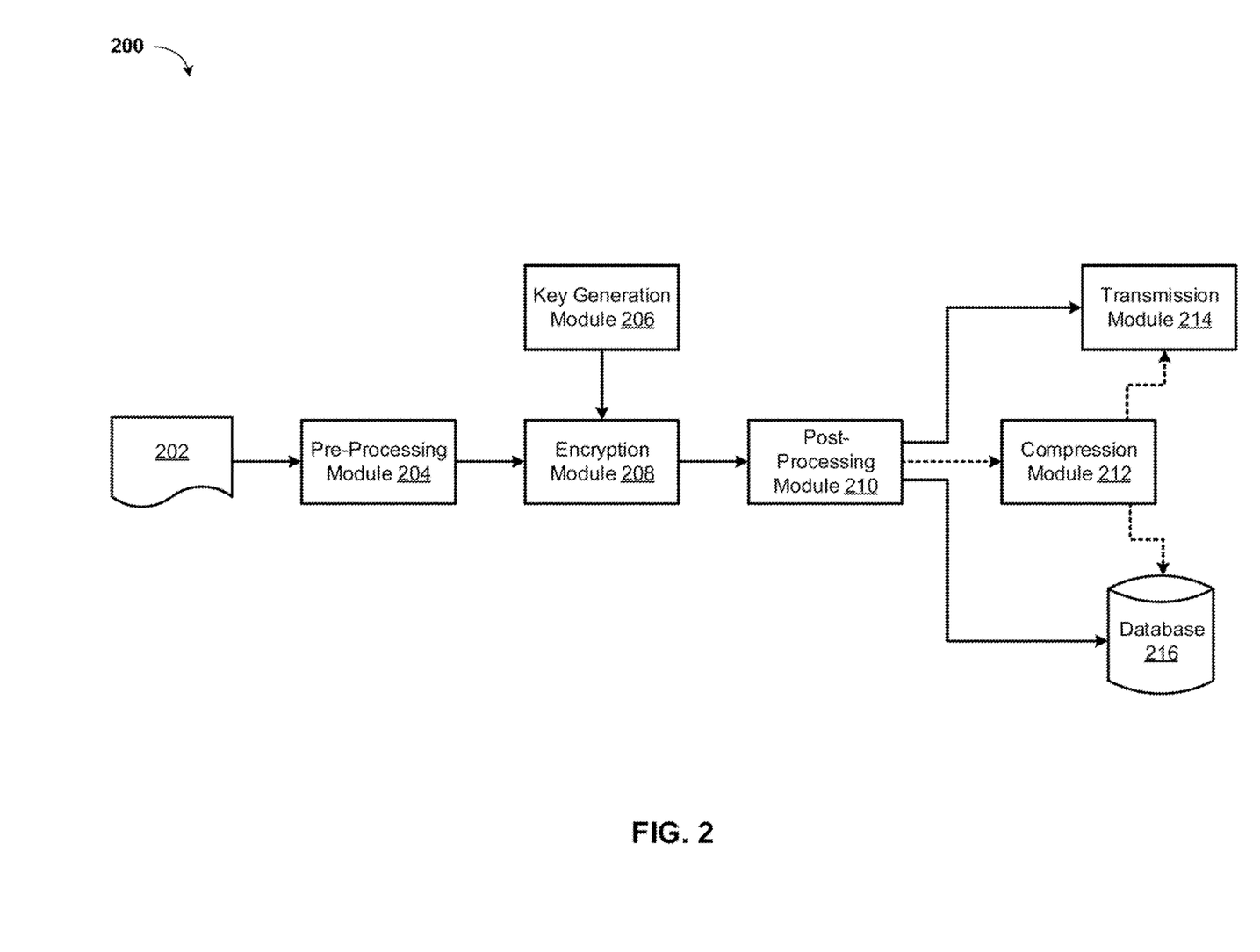
FIG. 2 is a block diagram of a system for encrypting binary files, according to at least one embodiment.

Referring now to FIG. 2, a system block diagram 300 of a binary file decryption system is depicted. The binary file decryption system may receive a binary file 202 as an input. The binary file 202 may be, among other things, an image, raw binary data, text, a video, and a sound. The binary file decryption system may include, among other things, a pre-processing module 204, a key generation module 206, an encryption module 208, a post-processing module 210, a compression module 212, a transmission module 214, and a database 216. It may be appreciated that the database 216 may be the same, substantially the same, or similar to the data storage device 108 (FIG. 1) on the computer 102 (FIG. 1) or the database 112 (FIG. 1) on the server computer 114 (FIG. 1).

The pre-processing module 204 may divide the binary file 202 into one or more channels. For example, the binary file 202 may be an image that may be divided into red, green, and blue channels with pixel intensity values $y_R$, $y_G$, and $y_B$ for red, green, and blue channel images, respectively. According to one embodiment, the pixel intensity values may have an 8-bit encoding for each channel, such that the pixel intensity values may be in the range [0, (L−1)], where L may equal 256. It may be assumed that the intensity values for the image may belong to the finite prime field $Z_p = \{0, 1, 2, \ldots, (p-1)\}$ of order p=257 (i.e., the lowest value prime number greater than the decimal value of the bit-depth of the image channels). However, it may be appreciated that the red, green, and blue channels may have any bit depth. Other non-image applications such as any data or information that can be mapped to numbers or bits are possible.

The key generation module 206 may select two randomly-chosen large prime numbers q and s, such that the greatest common divisor gcd(q*s, (q−1)(s−1))=1. This condition may be satisfied if q and s are prime numbers with the same length. The key generation module 206 may generate a public key N and private key by defining N=q×s and λ is the least common multiple lcm(q−1, s−1). The key generation module 206 may generate a large integer number Î that may be used as a new multiplicative identity. The key generation module may use the quantities q, s, N, and Î to compute $\hat{q}=q\hat{I}$, $\hat{s}=s\hat{I}$, and $\hat{N}=\hat{q}*\hat{s}=q\hat{I}(\hat{I}^{-1})s\hat{I}=(qs)\hat{I}=N\hat{I}$, where the operator $*=\hat{I}=\hat{I}^{-1}$.

The key generation module 206 may also generate a random integer $g \in Z^*_{N^2} = \{1, 2, \ldots, (N^2-1)\}$, such that the order l of g is a multiple of N. The private decryption key μ may be defined using the modulo operator as $\mu = \{[L(g^\lambda \mod N^2)]^{-1}\} \mod(N)$, where $L[U]=(U-1)N^{-1}$. The private key needed for decryption may be (λ, μ), while the public key needed for encryption is (N, g). Given Ñ, the value of N can be computed as $\hat{N}=N\hat{I}$. $\hat{N}^2=N^2\hat{I}$ may also be calculated. The values for $\hat{g}$ and $\hat{p}$ corresponding to g and p are given by $\hat{g}=\hat{I}+\hat{N}=\hat{I}+N\hat{I}=(1+N)\hat{I}=g\hat{I}$ and $\hat{p}=p\hat{I}$. Using these equation, the key generation module may calculate $L[\hat{U}]=(\hat{U}-\hat{I})*\hat{N}^{-1}=(U-1)\hat{I}(\hat{I}^{-1})\hat{I}N^{-1}=[(U-1)N^{-1}]\hat{I}=L[U]\hat{I}$.

The encryption module 208 may receive channel output data from the pre-processing module 204 and the encryption keys from the key generation module 206. The encryption module 208 may calculate the encrypted values $$E(\hat{y}_R)=\hat{g}_R^{\hat{y}}*\hat{x}_1^{\hat{N}} \mod(\hat{N}^2),$$

$$E(\hat{y}_G)=\hat{g}_G^{\hat{y}}*\hat{x}_2^{\hat{N}} \mod(\hat{N}^2), \text{ and}$$

$$E(\hat{y}_B)=\hat{g}_B^{\hat{y}}*\hat{x}_3^{\hat{N}} \mod(\hat{N}^2),$$

for the red, green, and blue channels, respectively, where $\hat{x}_i$ may be a random number in $\hat{Z}^*_N$.

The encrypted values $E(\hat{y}_R)$, $E(\hat{y}_G)$, and $E(\hat{y}_B)$ may be outside of the range of [0, (L−1)], so the modulus operation mod (p) may be applied, where p may equal 257 (i.e., closest prime number greater than 256), to yield:

$$\hat{C}_R=E(\hat{y}_R) \mod(p)=\{[\hat{g}_R^{\hat{y}}*x_1^{\hat{N}} \mod(\hat{N}^2)]\} \mod(p),$$

$$\hat{C}_G=E(\hat{y}_G) \mod(p)=\{[\hat{g}_G^{\hat{y}}*x_2^{\hat{N}} \mod(\hat{N}^2)]\} \mod(p), \text{ and}$$

$$\hat{C}_B=E(\hat{y}_B) \mod(p)=\{[\hat{g}_B^{\hat{y}}*x_3^{\hat{N}} \mod(\hat{N}^2)]\} \mod(p).$$

$\hat{C}_R$, $\hat{C}_G$, and $\hat{C}_B$ may represent one or more encrypted pixel intensity values. In the case of images, the post-processing module 210 may combine the encrypted pixel intensity values of the red, green, and blue channels of an image into a composite encrypted image. The composite encrypted image may optionally be compressed by the compression module 212. The composite encrypted image may be transmitted over the communication network 110 (FIG. 1) by the transmission module 214 or may be stored in the database 216.

Other parameters used for the decryption may include:

$$q_R=\left\lfloor\frac{E(\hat{y}_R)}{p}\right\rfloor, q_G=\left\lfloor\frac{E(\hat{y}_G)}{p}\right\rfloor, \text{ and}$$

$$q_B=\left\lfloor\frac{E(\hat{y}_B)}{p}\right\rfloor.$$

The quantities $q_R$, $q_G$, and $q_B$ may not be secret but may be encrypted using other encryption methods to increase the security of the cipher images. For software implementation purposes, it may be appreciated that it may be more efficient for the encryption module 208 to use matrices of pixels' intensity values instead of the values of individual pixels. Additionally, the multiplicative identity unit, may be considered a shared private key, and should be keep secret. The multiplicative identity unit may be used for decryption purposes and may be sent using a key exchange algorithm.

Figure 3:
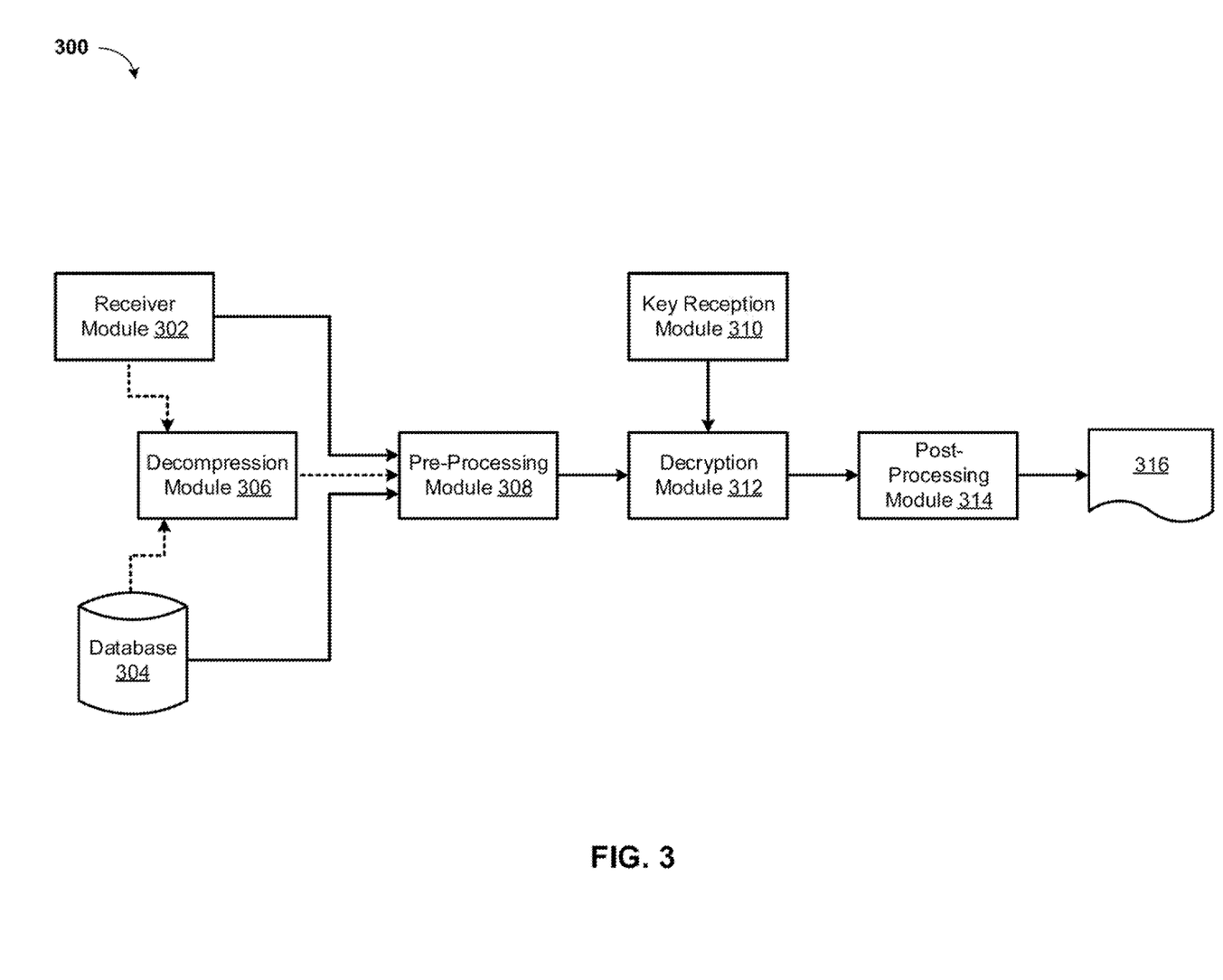
FIG. 3 is a block diagram of a system for decrypting binary files, according to at least one embodiment.

Referring now to FIG. 3, a system block diagram 300 of a binary file decryption system is depicted. The binary file decryption system may include, among other things, a receiver module 302, a database 304, a decompression module 306, a pre-processing module 308, a key reception module 310, a decryption module 312, and a post-processing module 314. The binary file decryption system may output a binary file 316 that may substantially correspond to a decrypted binary file. It may be appreciated that the database 304 may be the same, substantially the same, or similar to the data storage device 108 (FIG. 1) on the computer 102 (FIG. 1), the database 112 (FIG. 1) on the server computer 114 (FIG. 1), or the database 216 (FIG. 2). An encrypted binary file may be received by the receiver module 302 over the communication network 110 or may be retrieved from the database 304. The received encrypted binary file may optionally be passed to the decompression module 306, which may decompress the binary file if it was previously compressed. The pre-processing module 308 may divide the binary file into one or more channel. For example, the binary file may be an image, and the pre-processing module 308 may receive the quantities $q_R$, $q_G$, and $q_B$, in addition to pixel intensity values $\hat{C}_R$, $\hat{C}_G$, and $\hat{C}_B$. The pre-processing module 308 may reconstruct $E(\hat{y}_R)$, $E(\hat{y}_G)$, and $E(\hat{y}_B)$ from $\hat{C}_R$, $\hat{C}_G$, and $\hat{C}_B$ by calculating:

$$E(\hat{y}_R) = q_R \times p + \hat{C}_R = \hat{\alpha},$$

$$E(\hat{y}_G) = q_G \times p + \hat{C}_G = \hat{\beta}, \text{ and}$$

$$E(\hat{y}_B) = q_B \times p + \hat{C}_B = \hat{\gamma}.$$

The key reception module 310 may receive the private keys $\lambda$ and $\mu$ that may have been generated by the key generation module 206 (FIG. 2). The key reception module 310 may pass these keys to the decryption module 312. For example, the binary file may be an image, and the decryption module 312 may recover the original pixel intensity values for channels of the image. Red, green, and blue channels of the image may be computed as:

$$\hat{y}_R = \frac{L[\hat{\alpha}^\lambda \bmod (\hat{N}^2)]}{L[\hat{g}^\lambda \bmod (\hat{N}^2)]} \bmod(\hat{N}) = \left\{L[\hat{\alpha}^\lambda \bmod(\hat{N}^2)] * \hat{\mu}\right\} \bmod(\hat{N}),$$

$$\hat{y}_G = \frac{L[\hat{\beta}^\lambda \bmod (\hat{N}^2)]}{L[\hat{g}^\lambda \bmod (\hat{N}^2)]} \bmod(\hat{N}) = \left\{L[\hat{\beta}^\lambda \bmod(\hat{N}^2)] * \hat{\mu}\right\} \bmod(\hat{N}),$$

and $$\hat{y}_B = \frac{L[\hat{\gamma}^\lambda \bmod (\hat{N}^2)]}{L[\hat{g}^\lambda \bmod (\hat{N}^2)]} \bmod(\hat{N}) = \left\{L[\hat{\gamma}^\lambda \bmod(\hat{N}^2)] * \hat{\mu}\right\} \bmod(\hat{N}),$$

respectively.
To find $L[\hat{\alpha}^\lambda \bmod (\hat{N}^2)]$, the decryption module 312 may compute $U = \hat{a}^\lambda \bmod (\hat{N}^2) = (a^\lambda)\hat{I} \bmod (\hat{N}^2)$. Thus, $$L[\hat{a}^\lambda \bmod (\hat{N}^2)] = L(\hat{U}) = \frac{(\hat{U} - \hat{I})}{N} = L(U)\hat{I},$$

where $U = a^\lambda \bmod N^2$. The values of $y_R$, $y_G$, and $y_B$ may be given by $$y_R = \frac{\hat{y}_R}{\hat{I}}, y_G = \frac{\hat{y}_G}{\hat{I}}, \text{ and } y_B = \frac{\hat{y}_B}{\hat{I}}.$$

The post-processing module 314 may output the binary file 316 that may substantially correspond to the binary file 202 (FIG. 2).

Figure 4:
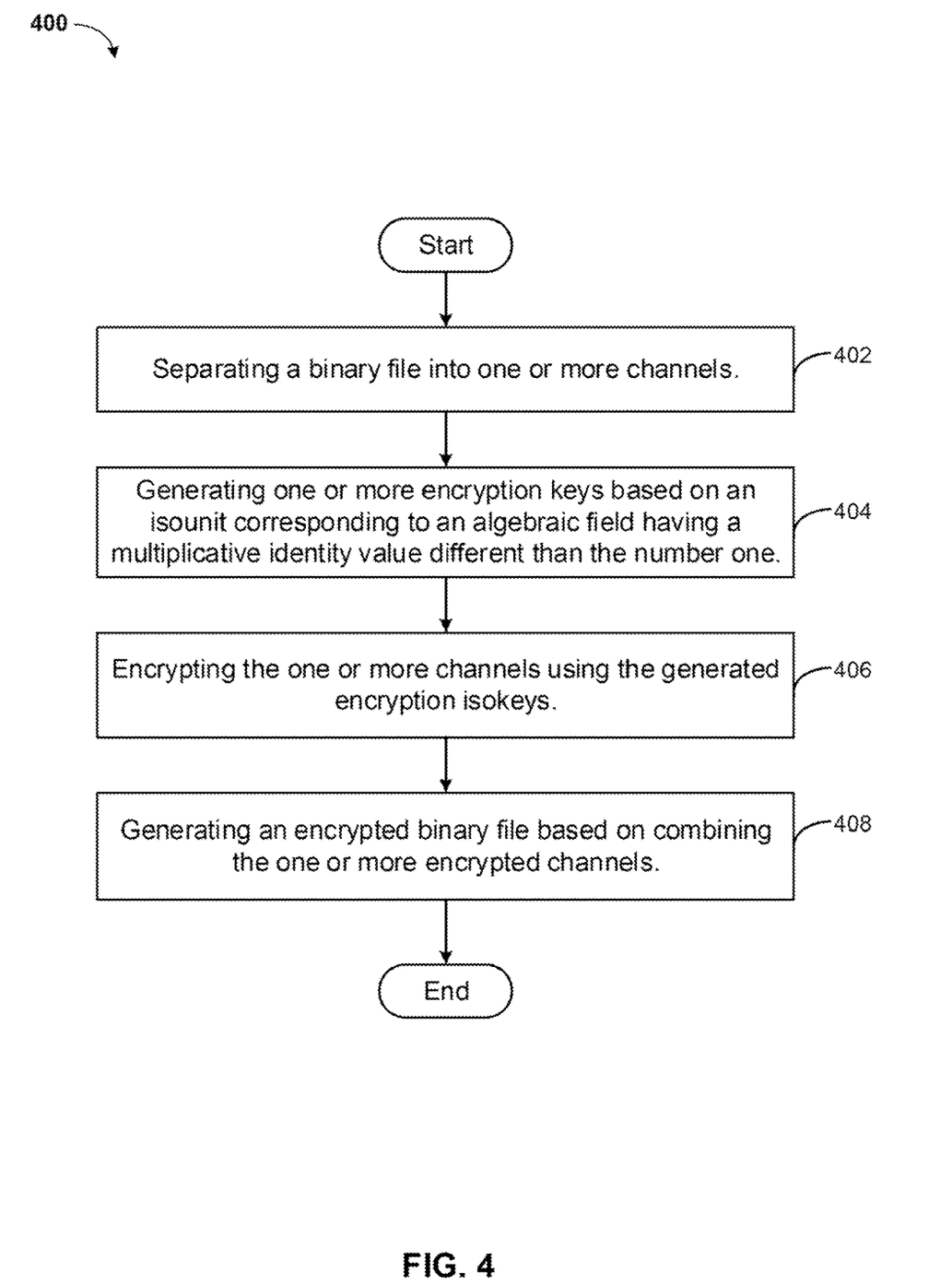
FIG. 4 is an operational flowchart illustrating the steps carried out by a program that encrypts binary files, according to at least one embodiment.

Referring now to FIG. 4, an operational flowchart 400 illustrating the steps carried out by a program that encrypts binary files is depicted. FIG. 4 may be described with the aid of FIGS. 1-3. As previously described, the Binary File Encryption Program 116 (FIG. 1) may quickly and effectively encrypt and decrypt images using public and private isokeys generated based on using a multiplicative identity other than one.

At 402, a binary file is separated into one or more channels. For example, in the case of images, an image may be separated into a red channel, a blue channel, and a green channel. Separating the image into multiple channels may allow for adjacent pairs of pixels that may be uncorrelated or less correlated in the horizontal and vertical directions because their corresponding correlation coefficients may be close to zero. Accordingly, this may allow for a break in the correction of adjacent pairs of pixels in the vertical and horizontal directions that may produce encrypted images that may be resistant to correlation analysis attacks. In operation, the Binary File Encryption Program 116 (FIG. 1) on the server computer 114 (FIG. 1) may receive a binary file 202 (FIG. 2) from the software program 108 (FIG. 1) on the computer 102 (FIG. 1) over the communication network 110 (FIG. 1). The pre-processing module 204 (FIG. 2) may separate the binary file 202 into constituent red, green, and blue channels.

At 404, one or more encryption keys are generated based on an isounit corresponding to an algebraic field having a multiplicative identity value different than the number one. The different multiplicative identity may allow for an additional degree of freedom in the encryption and decryption of RGB images by allowing for an additional secret number to be used in the generation of public and private keys. In operation, the key generation module 206 (FIG. 2) may generate a series of public keys N and g and private keys A and p using prime numbers and a multiplicative identity other than the number one. The key generation module 206 may pass the public keys to the encryption module 208 (FIG. 2) to be used in encrypting each of the channels separated by the pre-processing module 204 (FIG. 2).

At 406, the one or more channels are encrypted using the generated encryption isokeys. For example, in the case of images, the red, green, and blue channels may be encrypted using the generated encryption keys based on a pixel intensity value associated with each of the red, green, and blue channels. It may be appreciated that it is more efficient to use matrices of pixels' intensity values instead of individual pixels for encrypting each of the red, green, and blue channels. In operation, the encryption module 208 (FIG. 2) may receive the separated channels from the pre-processing module 204 (FIG. 2) and the public keys generated by the key generation module 206 (FIG. 2). The encryption module 208 may encrypt the channels using the generated public keys.

At 408, an encrypted binary file is generated based on combining the one or more encrypted channels. For example, in the case of images, a composite encrypted image is generated based on combining the encrypted red, green, and blue channels. By combining the encrypted channels into a composite encrypted image, a random static-like image may be formed that contains little or no correlation between adjacent pixel pairs. In operation, the post-processing module 210 (FIG. 2) may combine the encrypted channels received from the encryption module 208 (FIG. 2) into a composite encrypted binary file. The post-processing module may optionally pass the composite encrypted binary file to the compression module 212 (FIG. 2). The composite encrypted binary file may be passed to the transmission module 214 (FIG. 2) for transmission over the communication network 110 (FIG. 1) or stored in the database 216 (FIG. 2) for later retrieval and decryption.

It may be appreciated that FIG. 4 provides only an illustration of one implementation and does not imply any limitations with regard to how different embodiments may be implemented. Many modifications to the depicted environments may be made based on design and implementation requirements.

Figure 5:
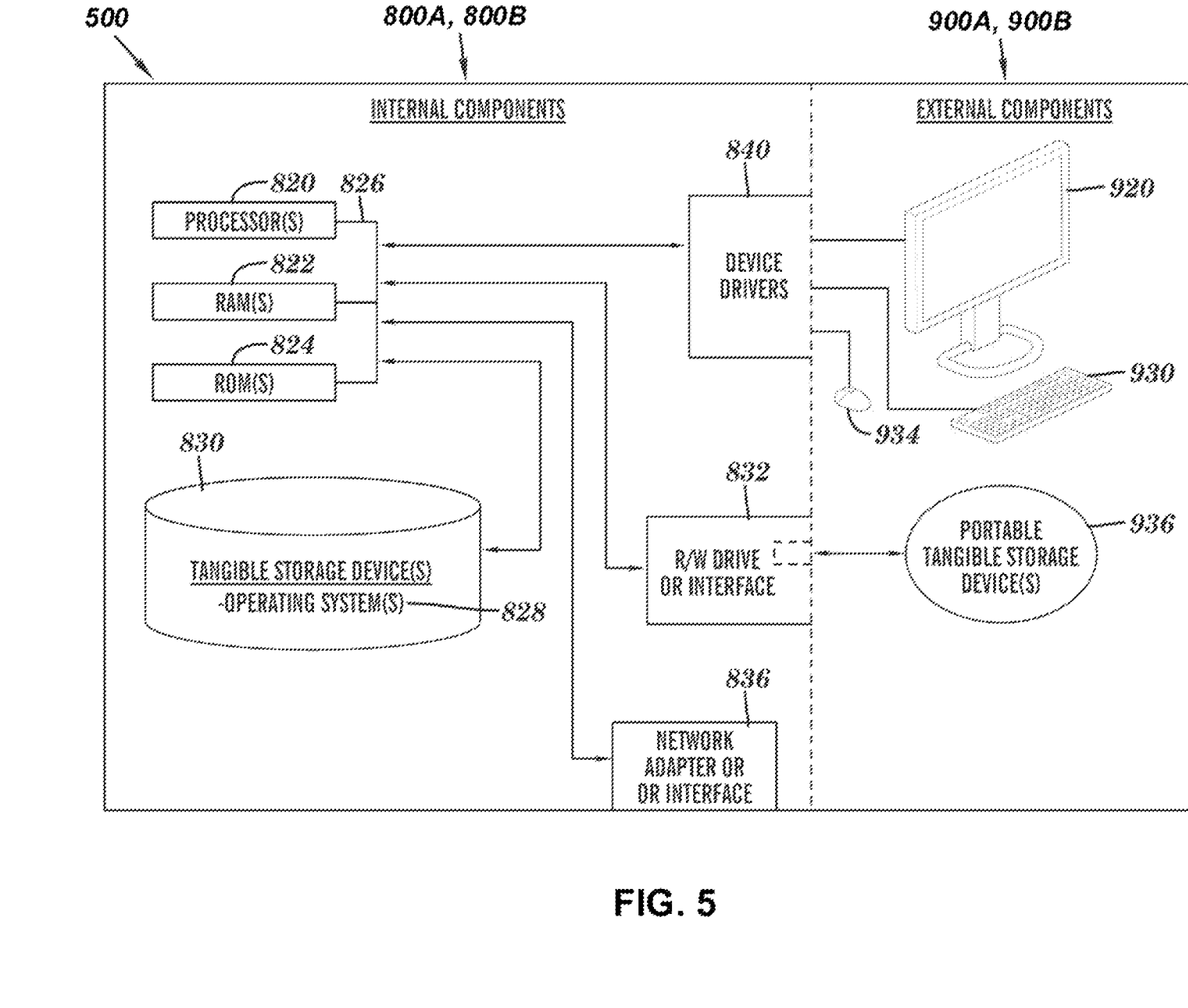
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Binary File Encryption Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A, B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Binary File Encryption Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Binary File Encryption Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Binary File Encryption Program 116 on the server computer 114 are loaded into the respective hard drive 830. The network may comprise copper wires, optical fibers, wireless transmission, routers, firewalls, switches, gateway computers and/or edge servers.

Each of the sets of external components 900A, B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
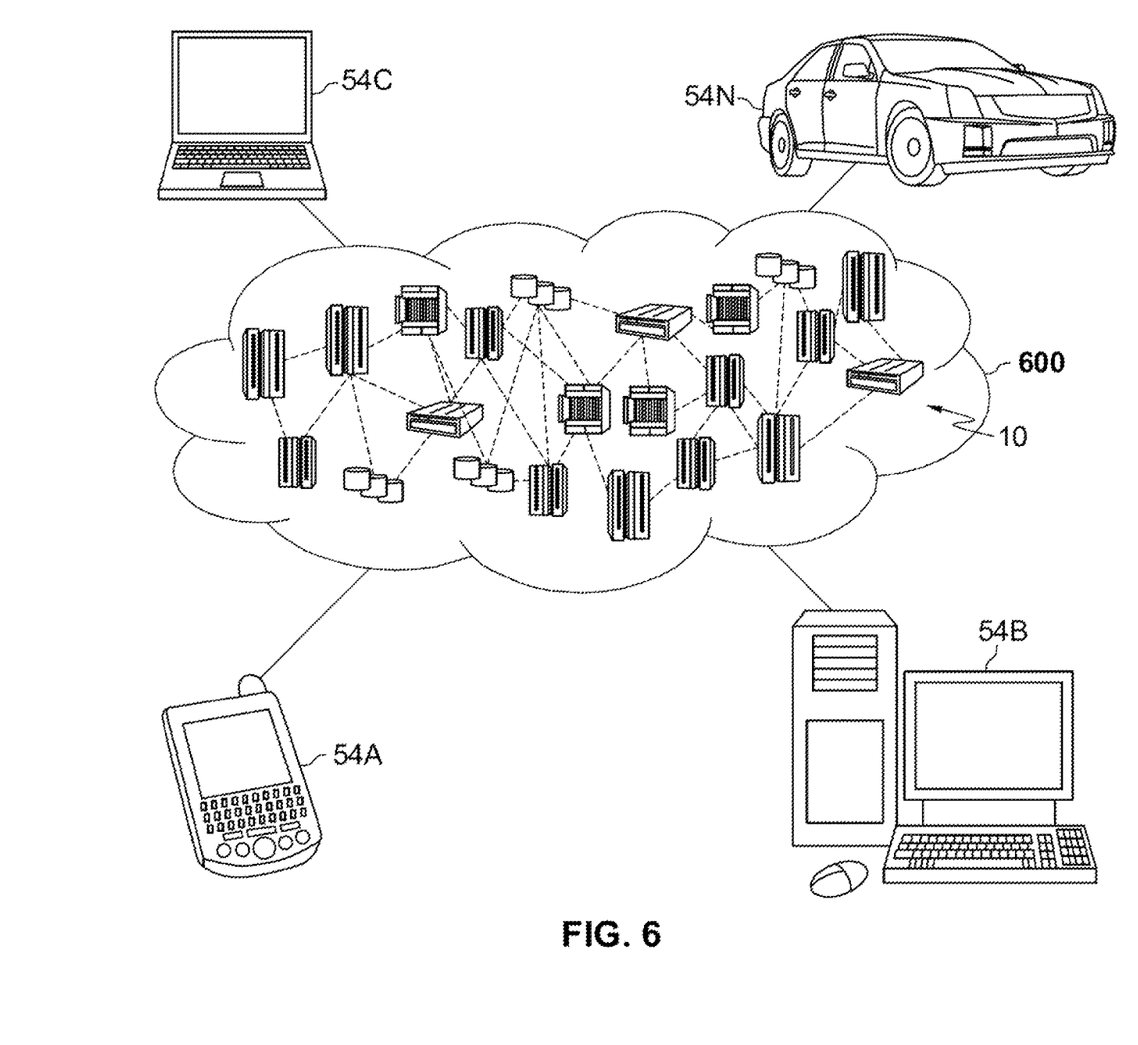
FIG. 6 is a block diagram of an illustrative cloud computing environment including the computer system depicted in FIG. 1, according to at least one embodiment.

Referring to FIG. 6, illustrative cloud computing environment 600 is depicted. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
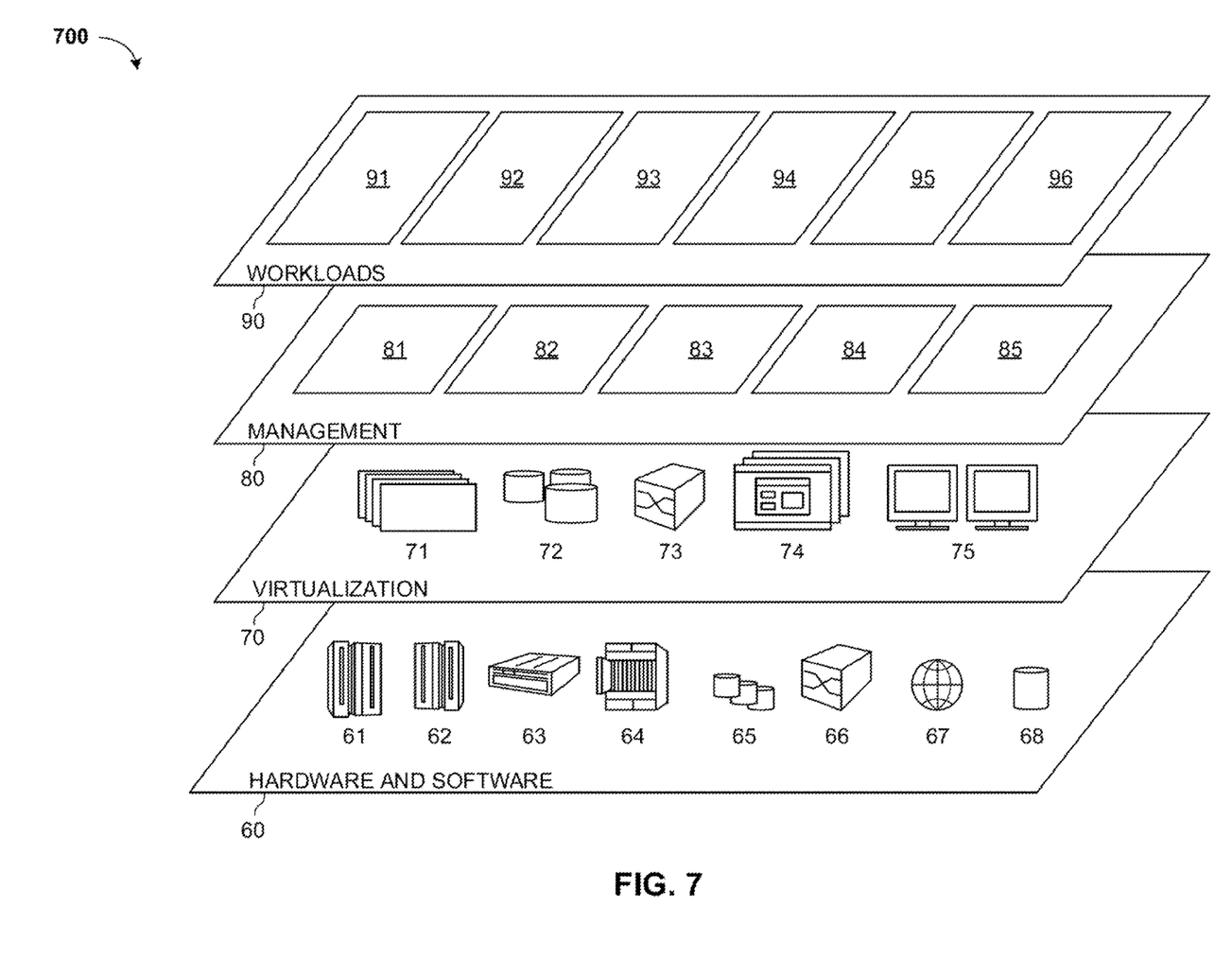
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Binary File Encryption 96. Binary File Encryption 96 may encrypt and decrypt binary files using public and private keys generated based on using a multiplicative identity other than one.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for encrypting binary files, executable by a processor, the method comprising:
    separating a binary file into one or more channels;
    generating one or more encryption isokeys based on an isounit corresponding to an algebraic field having a multiplicative identity value different than the number one, wherein generating the one or more encryption isokeys comprises:
        selecting two randomly-chosen prime numbers q and s, wherein q and s have a same length, and wherein a greatest common divisor of q×s and (q−1)(s−1) is the number one,
        generating a first public isokey $\hat{N}=\hat{q}*\hat{s}=(qs)\hat{I}$ based on a multiplicative identity unit $\hat{I}$, wherein $\hat{q}=q\hat{I}$ and $\hat{s}=s\hat{I}$, where the operator $*=\hat{T}=\hat{I}^{-1}$,
        generating a second public isokey $\hat{g}=\hat{I}+\hat{N}=g\hat{N}$, wherein g is a random integer having an order that is a multiple of N,
        generating a first private isokey $\hat{\lambda}$, wherein $\hat{\lambda}$ is a least common multiple of $(\hat{q}-\hat{I})$ and $(\hat{s}-\hat{I})$, and
        generating a second private isokey μ, wherein μ equals $\{[L(g^\lambda \bmod N^2)]^{-1}\} \bmod (N)$, $L[U]=(U-1)N^{-1}$, and the isokey $\hat{\mu}=\mu\hat{I}$;
    encrypting the one or more channels using the generated encryption isokeys based on computing $\{[\hat{g}_R{}^{\hat{y}}*\hat{x}^{\hat{N}} \bmod (\hat{N}^2)]\} \bmod(p)$ for each of the one or more channels, wherein $\hat{x}$ is a random isonumber and p is a prime number having a lowest value that is greater than a decimal value corresponding to a bit-depth of the one or more channels; and
    generating an encrypted binary file based on combining the one or more encrypted channels.

2. The method of claim 1, wherein the binary file comprises at least one from among an image, raw binary data, text, a video, and a sound.

3. The method of claim 1, wherein the binary file corresponds to an image, and wherein the image is separated into a red channel, a blue channel, and a green channel.

4. The method of claim 3, further comprising encrypting the red, green, and blue channels using the generated encryption isokeys based on a pixel intensity value associated with each of the red, green, and blue channels.

5. The method of claim 1, decrypting the one or more channels by computing $\{L[E(\hat{y}) \bmod(\hat{N}^2)]*\mu\}*\bmod(N)$ for each of the one or more channels, wherein $E(\hat{y})$ corresponds to an encrypted value corresponding to each of the one or more channels.

6. The method of claim 1, further comprising compressing the encrypted binary file.

7. The method of claim 1, further comprising transmitting the encrypted binary file.

8. The method of claim 1, further comprising storing the encrypted binary file in a database.

9. A computer system for encrypting binary files, the computer system comprising:
    one or more computer-readable non-transitory storage media configured to store computer program code; and
    one or more computer processors configured to access said computer program code and operate as instructed by said computer program code, said computer program code including:
    separating code configured to cause the one or more computer processors to separate a binary file into one or more channels;
    first generating code configured to cause the one or more computer processors to generate one or more encryption isokeys based on an isounit corresponding to an algebraic field having a multiplicative identity value different than the number one, wherein the first generating code comprises:
        selecting code configured to cause the one or more computer processors to select two randomly-chosen prime numbers q and s, wherein q and s have a same length, and wherein a greatest common divisor of q*s and (q−1)(s−1) is the number one;
        first public isokey generating code configured to cause the one or more computer processors to generate a first public isokey $\hat{N}=\hat{q}*\hat{s}=(qs)\hat{I}$ based on a multiplicative identity unit $\hat{I}$, wherein $\hat{q}=q\hat{I}$ and $\hat{s}=s\hat{I}$, where the operator $*=\hat{T}=\hat{I}^{-1}$;
        second public isokey generating code configured to cause the one or more computer processors to generate a second public isokey $\hat{g}=\hat{I}+\hat{N}=g\hat{N}$, wherein g is a random integer having an order that is a multiple of N;
        first private isokey generating code configured to cause the one or more computer processors to generate a first private isokey $\hat{\lambda}$, wherein $\hat{\lambda}$ is a least common multiple of $(\hat{q}-\hat{I})$ and $(\hat{s}-\hat{I})$; and
        second private isokey generating code configured to cause the one or more computer processors to generate a second private isokey μ, wherein μ equals $\{[L(g^\lambda \bmod N^2)]^{-1}\} \bmod (N)$, $L[U]=(U-1)N^{-1}$, and $\hat{\mu}=\mu\hat{I}$;
    encrypting code configured to cause the one or more computer processors to encrypt the one or more channels using the generated encryption isokeys based on computing $\{[\hat{g}_R{}^{\hat{y}}*\hat{x}^{\hat{N}} \bmod(\hat{N}^2)]\} \bmod(p)$ for each of the one or more channels,
    wherein $\hat{x}$ is a random isonumber and p is a prime number having a lowest value that is greater than a decimal value corresponding to a bit-depth of the one or more channels; and second generating code configured to cause the one or more computer processors to generate an encrypted binary file based on combining the one or more encrypted channels.

10. The computer system of claim 9, wherein the binary file comprises at least one from among an image, raw binary data, text, a video, and a sound.

11. The computer system of claim 9, wherein the binary file corresponds to an image, and wherein the image is separated into a red channel, a blue channel, and a green channel.

12. The computer system of claim 11, further comprising encrypting code configured to cause the one or more computer processors to encrypt the red, green, and blue channels using the generated encryption isokeys based on a pixel intensity value associated with each of the red, green, and blue channels.

13. The computer system of claim 9, further comprising decrypting code configured to cause the one or more computer processors to decrypt the one or more channels by computing $\{L[E(\hat{y})^{\hat{\lambda}} \bmod(\hat{N}^2)]*\mu\}*\bmod(\hat{N})$ for each of the one or more channels, wherein $E(\hat{y})$ corresponds to an encrypted value corresponding to each of the one or more channels.

14. The computer system of claim 9, further comprising compressing code configured to cause the one or more computer processors to compress the encrypted binary file.

15. The computer system of claim 9, further comprising storing code configured to cause the one or more computer processors to store the encrypted binary file in a database.

16. A non-transitory computer readable medium having stored thereon a computer program for encrypting binary files, the computer program configured to cause one or more computer processors to:

separate a binary file into one or more channels;

generate one or more encryption isokeys based on an isounit corresponding to an algebraic field having a multiplicative identity value different than the number one, wherein generating the one or more encryption isokeys comprises:

selecting two randomly-chosen prime numbers q and s, wherein q and s have a same length, and wherein a greatest common divisor of q×s and (q−1)(s−1) is the number one, generating a first public isokey $\hat{N}=\hat{q}*\hat{s}=(qs)\hat{I}$ based on a multiplicative identity unit $\hat{I}$, wherein $\hat{q}=q\hat{I}$ and $\hat{s}=s\hat{I}$, where the operator $*=\hat{T}=\hat{I}^{-1}$, generating a second public isokey $\hat{g}=\hat{I}+\hat{N}=g\hat{N}$, wherein g is a random integer having an order that is a multiple of N, generating a first private isokey $\hat{\lambda}$, wherein $\hat{\lambda}$ is a least common multiple of $(\hat{q}-\hat{I})$ and $(\hat{s}-\hat{I})$, and generating a second private isokey μ, wherein μ equals $\{[L(g^{\lambda} \bmod N^2)]^{-1}\} \bmod (N)$, $L[U]=(U-1)N^{-1}$, and the isokey $\hat{\mu}=\mu\hat{I}$;

encrypt the one or more channels using the generated encryption isokeys based on computing $\{[\hat{g}_R^{\hat{y}}*\hat{x}^{\hat{N}} \bmod (\hat{N}^2)]\} \bmod(p)$ for each of the one or more channels, wherein $\hat{x}$ is a random isonumber and p is a prime number having a lowest value that is greater than a decimal value corresponding to a bit-depth of the one or more channels; and generate an encrypted binary file based on combining the one or more encrypted channels.

* * * * *